(12) United States Patent
Yean

(10) Patent No.: US 6,173,910 B1
(45) Date of Patent: Jan. 16, 2001

(54) PRESS STRUCTURE OF WASHING HEAD FOR KITCHEN CABINET

(75) Inventor: Her-Far Yean, Chang-Hua (TW)

(73) Assignee: Chya Ye Industrial Co., Ltd., Chang-Hua (TW)

( * ) Notice: Under 35 U.S.C. 154(b), the term of this patent shall be extended for 0 days.

(21) Appl. No.: 09/418,127

(22) Filed: Oct. 14, 1999

(51) Int. Cl.[7] .................................................. B05B 7/02

(52) U.S. Cl. ............................................ 239/525; 239/583

(58) Field of Search .................................. 239/525, 526, 239/569, 583; 251/240, 245

(56) References Cited

U.S. PATENT DOCUMENTS

| | | | |
|---|---|---|---|
| 3,498,546 | * 3/1970 | Logan et al. | 239/583 |
| 4,344,578 | * 8/1982 | Shames et al. | 239/583 |
| 5,662,276 | * 9/1997 | Ko | 239/526 X |

* cited by examiner

Primary Examiner—Lesley D. Morris
(74) Attorney, Agent, or Firm—Dougherty & Troxell

(57) ABSTRACT

A press structure of washing head for kitchen cabinet, including a washing head main body, a pushing pin, a small water sealing washer, an adjusting/controlling valve, a large water sealing washer, a spring, a locking ring, a water sealing ring, a water injecting body, a screw, a decorative cap and a press lever. The main body is a tubular body and substantially V-shaped, having an upper water injecting section and a lower grip section. A two-step thread hole is disposed in the lower end of the grip section. An extending socket is disposed on upper side of the thread hole. A rear side of the middle section of the main body is formed with a press lever cavity. The upper side of front end of the press lever cavity is disposed with a projecting engaging tongue and a stopper tongue. A top end of the pushing pin is disposed with an arch projection. An upper section is formed with a shallow annular groove. A rear end is disposed with a small water sealing ring. The upper section is inserted with a large water sealing ring. A lower section is formed with a stopper edge. The centers of two faces of the locking ring are respectively formed with two recesses. The water injecting body is a two-step hollow cylindrical body. A front end of the large diameter step thereof is formed with several water outlets. The press lever is substantially V-shaped. A front end face of the press lever is formed with an engaging cavity. An upper end of the engaging cavity is formed with an engaging section. A lower end thereof is formed with a stopper section. The bottom face of front section of the press lever is formed with a circular pushing dent.

1 Claim, 5 Drawing Sheets

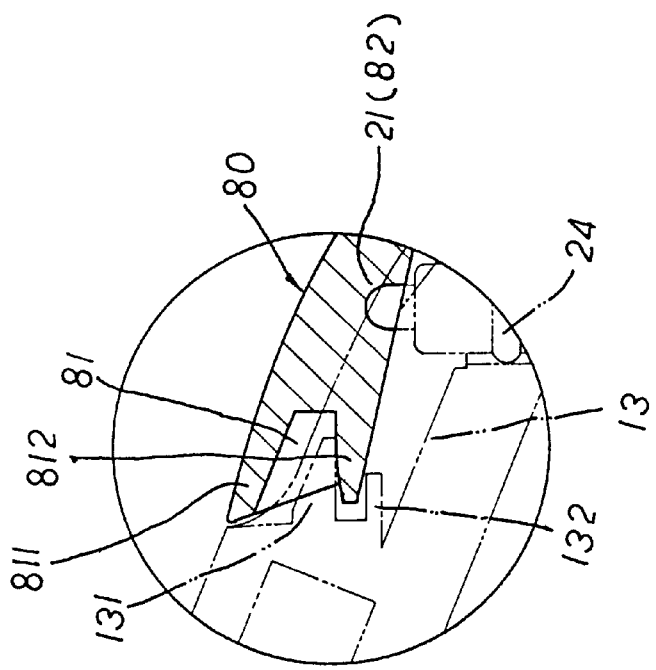
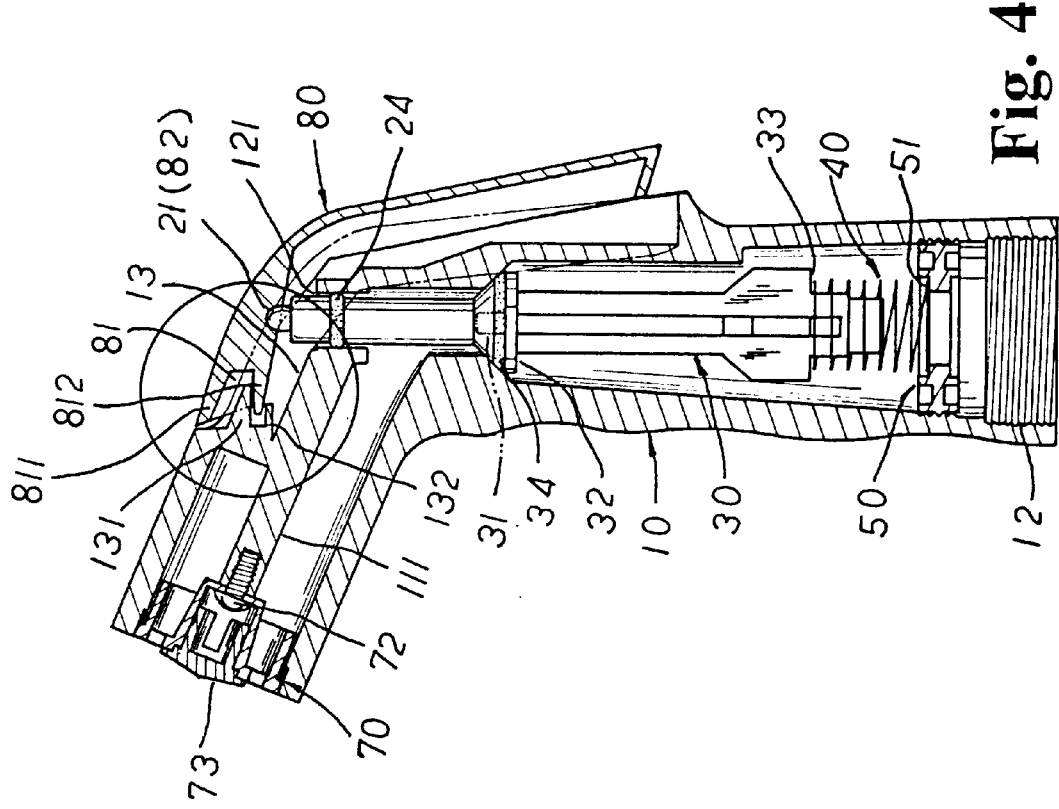
Fig. 4 A
Fig. 4

PRESS STRUCTURE OF WASHING HEAD FOR KITCHEN CABINET

BACKGROUND OF THE INVENTION

The present invention relates to a press structure of washing head for kitchen cabinet. When assembling the press lever, the engaging cavity of the press lever is pushed forward to engage into the engaging tongue of the main body. After assembly, the press lever is received in the press lever cavity of the main body without any gap between the press lever and the outer side of the main body. Therefore, in assembling or use, the structure is prevented from being broken or damaged and the using life is prolonged.

FIG. 1 shows a press structure of the washing head of an existing kitchen cabinet. The press structure includes a main body 100, an adjusting/controlling valve 200, a spring 300, a stopper plate 400, a connecting body 500, a water injecting body 600, a water injecting cap 620, a screw 630, a decorative cap 640, a sleeve 600 and a press lever 800. In the end opening 110 of the head section of the main body 100 is disposed a locking post 1110. The connecting opening 120 of the lower end of the grip is formed with an inner thread 1210. The upper end of the grip is disposed with an upward extending socket 1220. The top edge of the rear section of the head of the main body 100 is disposed with a recessed section 130. The upper end of the recessed section 130 is disposed with a rectangular engaging section 1310 with a certain height. Two sides of the engaging section 1310 are respectively formed with two rectangular engaging cavities 1320. The top end of the adjusting/controlling valve 200 is disposed with a projecting conic body 210. The upper section of the valve 200 is fitted with a small water sealing ring 220. The middle section is fitted with a large water sealing ring 230. The lower section is formed with a stopper edge 240. The centers of two faces of the stopper plate 400 are respectively formed with two recesses 410. The top face of the connecting body 500 is disposed with an upward projecting hollow boss 510 formed with outer thread 520. The lower side of the boss 510 is disposed with a flange 530. The outer circumference of the middle diameter step of the water injecting body 600 is inserted with a water sealing ring 610. Two sides of front end of the press lever 800 are respectively disposed with two engaging arms 810. The middle and rear sections are formed as a lever section 820. The bottom face of front section is disposed with two semicircular pressing blocks 830.

FIG. 2 shows the assembly of the conventional washing head. When assembled, the adjusting/controlling valve 200 is fitted into the connecting opening 120 of the main body 100 with the upper end of the adjusting/controlling valve 200 protruding out of the extending socket 1220 of the main body 100. The spring 300 is fitted into the connecting opening 120 of the main body 100. The upper end of the spring 300 abuts against the stopper edge 240 of the lower section of the adjusting/controlling valve 200. The stopper plate 400 is fitted into the connecting opening 120 of the main body 100. The lower end of the spring 300 abuts against the recess 3\410 of the top face of the stopper plate 400. The outer thread 520 of the boss 510 of the connecting body 500 is screwed with the inner thread 1210 of the connecting opening 120 and the flange 530 of the connecting body 500 abuts against the end edge of the connecting opening 120. The end face of the boss 510 of the connecting body 500 upward pushes the stopper plate 400 to slightly compress the spring 300. The two engaging arms 810 of the press lever 800 are forcedly pivotally fitted into the engaging cavities 1320 of two sides f the engaging section 1310 of the recessed section 130 of the main body 100. The projecting conic body 210 of the adjusting/controlling valve 200 is received in the space between the two semicircular pressing blocks 830 of the press lever 800. The small and middle diameter steps of the water injecting body 600 are fitted into the end opening 110 of the main body 100. The water injecting cap 620 is plugged into the middle diameter step of the water injecting body 600. The screw 630 is passed through the stepped hole of the water injecting cap 620 and screwed with the locking post 1110 of the main body 100. Then the decorative cap 640 is inserted on the end opening of the water injecting cap 620. Finally, the sleeve 700 is fitted with the head section of the main body 100 to complete the assembly.

When injecting water, the lever section 820 of the press lever 800 is depressed to make the two semicircular projecting blocks 830 downward press the adjusting/controlling valve 200. The small water sealing ring 220 is downward frictionally slid against inner wall of the extending socket 1220. The stopper edge 240 of the adjusting/controlling valve 200 downward compresses the spring 300. At this time, the large water sealing ring 230 of the valve 200 and the inner wall of the conic grip of the main body 100 define a gap through which the water flows from the connecting opening 120 to be injected from the water injecting hole between the water injecting body 600 and the water injecting cap 620. When shutting off the water, the lever section 820 is released and the valve 200 is upward resiliently pushed by the spring 300. The small water sealing ring 220 is upward frictionally moved against the inner wall of the extending socket 1220 to push the press lever 800 back to its home position. At this time, the large water sealing ring 230 of the valve 200 tightly abuts against the inner wall of the grip of the main body 100 and the water incoming from the connecting opening 120 is stopped by the large water sealing ring 230 and shut off.

The above conventional structure has some shortcomings as follows:

1. When fitting the engaging arms 810 of the press lever 800 into the engaging cavities 1320 of the engaging section 1310, the engaging arms 810 are forcedly stretched laterally and then engaged into the engaging cavities 1320 of the main body 100. Such operation tends to break the engaging arms 810 and makes it impossible to assemble the washing head.

2. When assembling the press lever 800 with the main body 100, the spring 300 resiliently abuts against the adjusting/controlling valve 200. Therefore, the rear section of the press lever 800 is lifted by a certain height to form a gap between the press lever 800 and the outer side thereof. This gap is likely to hook an adjacent article in use and incautiously pull and break the press lever 800.

SUMMARY OF THE INVENTION

It is therefore a primary object of the present invention to provide a press structure of washing head for kitchen cabinet. When assembling the press lever, the engaging cavity of the press lever is pushed forward to engage into the engaging tongue of the main body with the stopper section of the press lever abutting against the upper side of the stopper tongue of the main body. By such assembling operation, the structure is prevented from being broken or damaged.

It is a further object of the present invention to provide the above press structure of washing head for kitchen cabinet in which after assembled, the press lever is received in the press lever cavity of the main body without any gap between the press lever and the press lever cavity. Therefore, the adjacent article will not be hooked and the breakage of the structure is avoided. In case a strong force upward pulls the press lever, the stopper section thereof will move upward and backward to disengage from the stopper tongue of the main body and lose the engaging force. Therefore, the engaging cavity of the press lever will be entirely separated from the engaging tongue of the main body to avoid damage of the structure. When installing the press lever back, the engaging cavity of the press lever is pushed forward to engage into the engaging tongue of the main body with the stopper section of the press lever abutting against the stopper tongue of the main body for further use. Therefore, the using cost is reduced and the using life is prolonged.

The present invention can be best understood through the following description and accompanying drawings wherein:

BRIEF DESCRIPTION OF THE DRAWINGS

FIG. 4 is a sectional assembled view and an enlarged view of the press structure of the present invention; and FIG. 4A is an enlarged sectional diagram showing the operation of the press lever;

DETAILED DESCRIPTION OF THE PREFERRED EMBODIMENT

Figure 1:
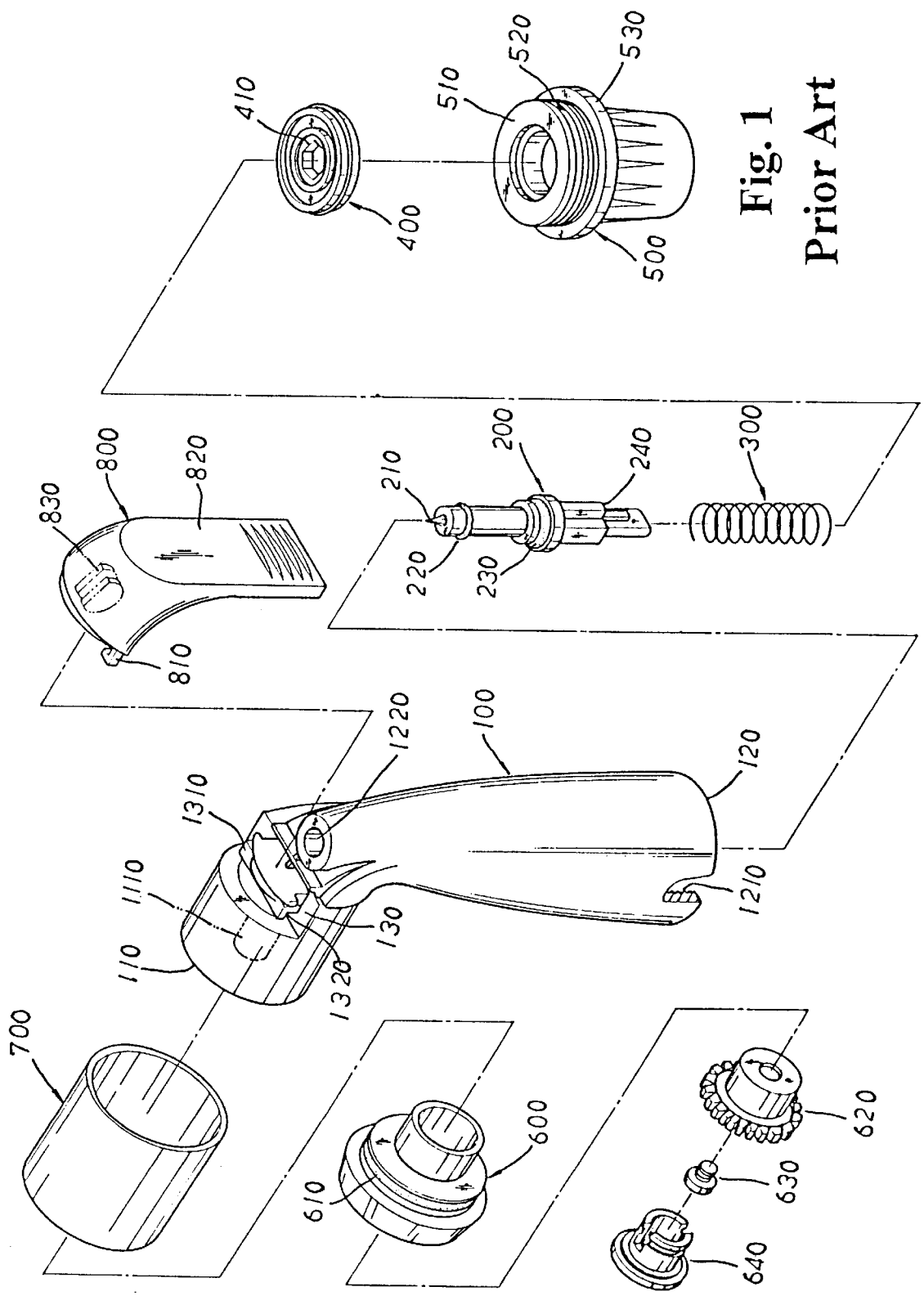
FIG. 1 is a perspective exploded view of the conventional press structure.
Figure 2A:
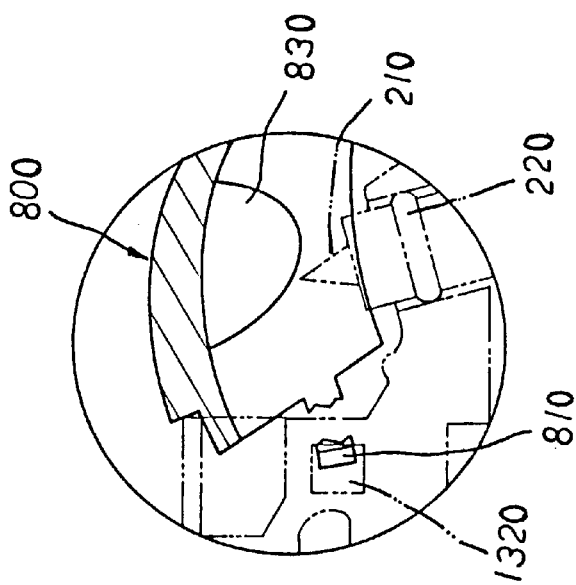
FIG. 2A is an enlarged sectional diagram for the conventional press lever in operation.
Figure 2:
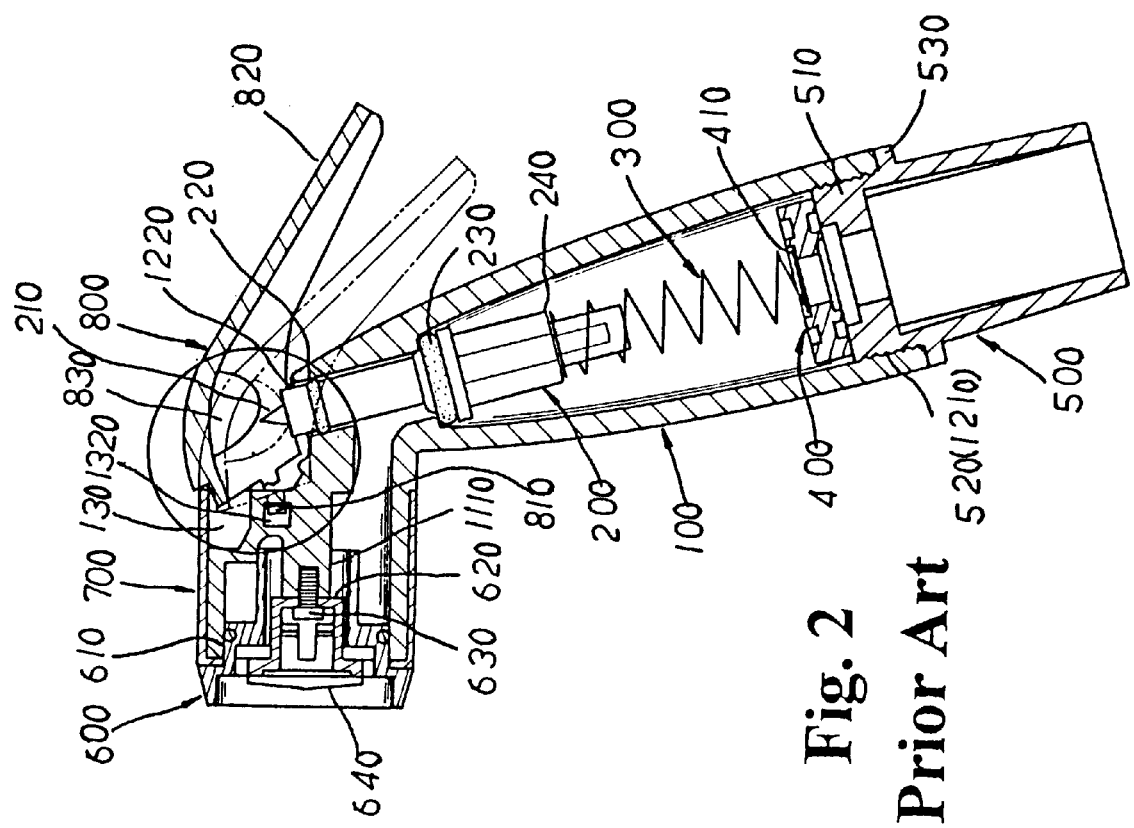
FIG. 2 is a sectional assembled view of the conventional press structure, showing the operation of the press lever and the breakage of the press lever in use.
Figure 3:
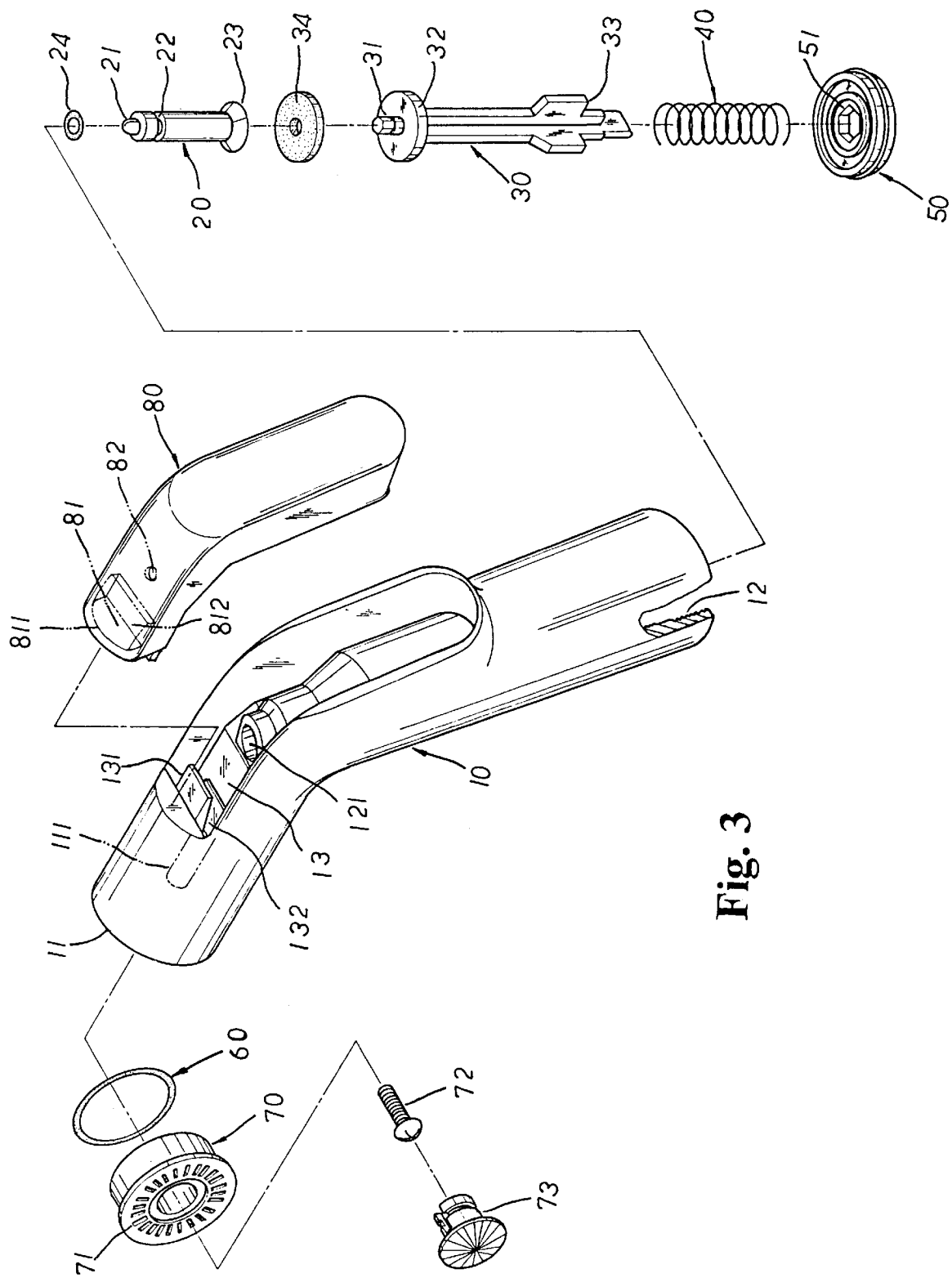
FIG. 3 is a perspective exploded view of the press structure of the present invention.
Figure 5:
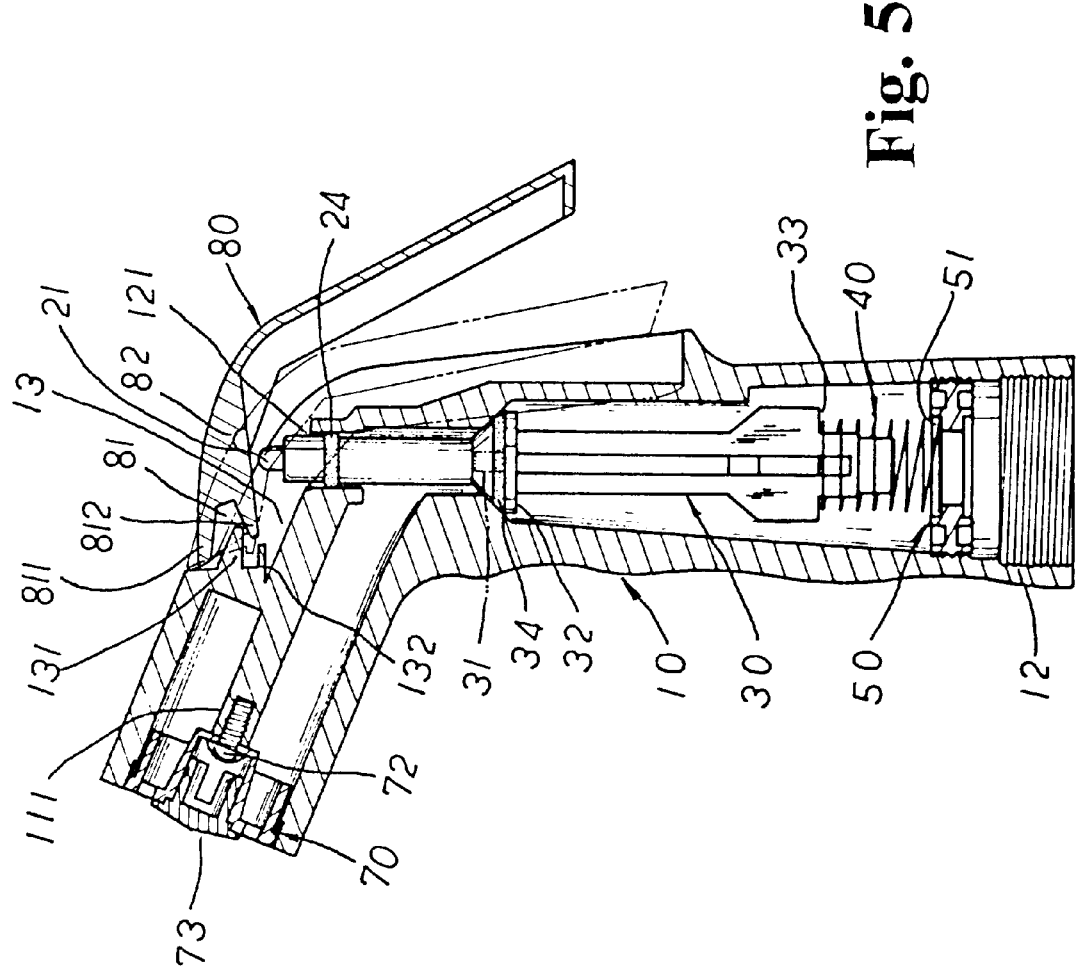
FIG. 5 shows that the press lever of the present invention is separated from the washing head main body.

Please refer to FIG. 3. The present invention includes a washing head main body 10, a pushing pin 20, a small water sealing washer 24, an adjusting/controlling valve 30, a large water sealing washer 34, a spring 40, a locking ring 50, a water sealing ring 60, a water injecting body 70, a screw 72, a decorative cap 73 and a press lever 80. The main body 10 is made of plastic material by integral molding and is substantially V-shaped. The upper section is a water injecting section, while the lower section is a grip section. A locking post 111 is disposed in the end opening 11 of the water injecting section. A two-step thread hole 12 is disposed in the lower end of the grip section. An extending socket 121 is disposed on upper side of the thread hole 12. The rear side of the middle section of the main body 10 is formed with a press lever cavity 13. The upper side of front end of the press lever cavity 13 is disposed with a projecting engaging tongue 131 and a stopper tongue 132. The engaging tongue 131 is longer and formed with a guide slope on front side. The stopper tongue 132 is shorter and positioned under the engaging tongue 131 by a certain distance. The top end of the pushing pin 20 is disposed with an arch projection 21. The upper section is formed with a shallow annular groove 22. The rear end is disposed with a small water sealing ring 23. The tope end of the adjusting/controlling valve 30 is disposed with a hexagonal projecting post 31. The upper section is inserted with a large water sealing ring 32. The lower section is formed with a stopper edge 33. The centers of two faces of the locking ring 50 are respectively formed with two recesses 51. The water injecting body 70 is a two-step hollow cylindrical body. The front end of the large diameter step is formed with several water outlets 71. The press lever 80 is made of plastic material by integral molding and is substantially V-shaped. The front end face is disposed with an engaging cavity 81. The upper end of the engaging cavity 81 is formed with an engaging section 811. The lower end is formed with a stopper section 812. The bottom face of front end of the press lever 80 is formed with a circular pushing dent 82.

FIGS. 4, 4A show the assembly of the present invention. When assembled, the engaging cavity 81 of the press lever 80 is pushed forward to engage with the engaging plate 131 of the main body 10. The stopper section 812 of the press lever 80 abuts against the stopper tongue 132 of the main body 10. Then the small water sealing washer 24 is fitted into the shallow groove 22 of the pushing pin 20. The large water sealing washer 34 is passed through the projecting post 31 of the adjusting/controlling valve 30 and fitted with upper side of the large sealing ring 32. Then the pushing pin 20 is fitted onto the large water sealing ring 32 of the adjusting/controlling valve 30. The assembled pushing pin 20 and the adjusting/controlling valve 30 are fitted into the two-step thread hole 12 of the main body 10. The upper end of the pushing pin 20 protrudes beyond the extending socket 121. The arch projection 21 of the pushing pin 20 is received in the pushing dent 82 of the press lever 80. Then the spring 40 is fitted into the two-step thread hole 12 of the main body 10 with the upper end edge abutting against the stopper edge 33 of the lower section of the adjusting/controlling valve 30. The locking ring 50 is fitted and screwed in the small diameter step of the two-step thread hole 12 with the recess 51 of the top face abutting against the lower end edge of the spring 40. The locking ring 50 upward pushes and slightly compresses the spring 40. The water sealing ring 60 is fitted into the small diameter step of the water injecting body 70 and the small diameter section of the water injecting body 70 is plugged into the end opening 11 of the main body 10. The screw 72 is passed through the central hole of the water injecting body 70 and screwed with the locking post 111 of the main body 10. Then the decorative cap 73 is inserted with the end opening of the water injecting body 70 to complete the assembly.

When injecting the water, the press lever 80 is pressed downward to make the pushing dent 82 downward press the pushing pin 20. At this time, the small water sealing washer 24 of the pushing pin 20 is downward frictionally slid against the inner wall of the extending socket 121. The stopper edge 33 of the adjusting/controlling valve 30 downward compresses the spring 40. The large water sealing ring 32 of the valve 30 and the inner wall of the conic grip of the main body 10 define therebetween a gap. The water flows from the two-step thread hole 12 of the main body 10 through the gap to be injected outward from the water outlet 71 of the water injecting body 70. When shutting off the water, the press lever 80 is released and the adjusting/controlling valve 30 and the pushing pin 20 are upward pushed by the resilient force of the spring 40. The small water sealing washer 24 is upward frictionally moved against the inner wall of the extending socket 121 to push the press lever 80 back to its home position. At this time, the large water sealing ring 32 of the adjusting/controlling valve 30 tightly abuts against the inner wall of the grip of the main body 10 and the water incoming from the two-ste thread hole 12 is stopped by the large water sealing ring 32 of the adjusting/controlling valve 30 so as to shut off the water.

According to the above arrangement, the present invention has the following advantages:

1. When assembled, the engaging cavity 81 of the press lever 80 is pushed forward to engage with the engaging tongue 131 of the main body 10. The stopper section 812 of the press lever 80 abuts against the upper side of the stopper tongue 132 of the main body 10. Such assembly will not lead to breakage or damage of the structure.

2. After assembled, the press lever 80 is received in the press lever cavity 13 of the main body 10 without any gap between the press lever 80 and the press lever cavity 13. Therefore, the adjacent article will not be hooked and the breakage of the structure is avoided. In case a strong force upward pulls the press lever 80, the stopper section 812 thereof will move upward and backward to disengage from the stopper tongue 132 of the main body 10 and lose the engaging force.

What is claimed is:

1. A press structure of washing head for kitchen cabinet, comprising a washing head main body, a pushing pin, a small water sealing washer, an adjusting/controlling valve, a large water sealing washer, a spring, a locking ring, a water sealing ring, a water injecting body, a screw, a decorative cap and a press lever, the main body being a tubular body and substantially V-shaped, an upper section being a water injecting section, while a lower section being a grip section, a locking post being disposed in an end opening of the water injecting section, a two-step thread hole being disposed in the lower end of the grip section, an extending socket being disposed on upper side of the thread hole, a rear side of the middle section of the main body being formed with a press lever cavity, a top end of the pushing pin being disposed with an arch projection, an upper section being formed with a shallow annular groove, a rear end being disposed with a small water sealing ring, a top end of the adjusting/controlling valve being disposed with a hexagonal projecting post, the upper section being inserted with a large water sealing ring, a lower section being formed with a stopper edge, the centers of two faces of the locking ring being respectively formed with two recesses, the water injecting body being a two-step hollow cylindrical body, a front end of the large diameter step thereof being formed with several water outlets, the press lever being substantially V-shaped, a bottom face of front section being formed with a pushing dent, the small water sealing washer being fitted into the shallow groove of the pushing pin, the large water sealing washer being passed through the projecting post of the adjusting/controlling valve and fitted with upper side of the large water sealing ring, the pushing pin being fitted onto the large water sealing ring of the adjusting/controlling valve, the assembled pushing pin and the adjusting/controlling valve being fitted into the two-step thread hole of the main body, the upper end of the pushing pin protruding beyond the extending socket, the arch projection of the pushing pin being received in the pushing dent of the press lever, the spring being fitted into the two-step thread hole of the main body, the locking ring being fitted and screwed in the small diameter step of the two-step thread hole, the water sealing ring being fitted into the small diameter step of the water injecting body, the small diameter section of the water injecting body being plugged into the end opening of the main body, the screw being passed through the central hole of the water injecting body and screwed with the locking post of the main body, the decorative cap being inserted with the end opening of the main body, said press structure being characterized in that the upper side of front end of the press lever cavity of the main body is disposed with a projecting engaging tongue and a stopper tongue, the engaging tongue being longer and formed with a guide slope on front side, the stopper tongue being shorter and positioned under the engaging tongue by a certain distance, a front end face of the press lever being formed with an engaging cavity, an upper end of the engaging cavity being formed with an engaging section, a lower end thereof being formed with a stopper section, whereby the engaging cavity of the press lever is pushed forward to engage with the engaging tongue of the main body with stopper section of the press lever abutting against the stopper tongue of the main body and after assembled, the press lever is received in the press lever cavity of the main body without any gap between the press lever and the outer side of the main body.

* * * * *